(12) United States Patent
Jeon et al.

(10) Patent No.: US 11,789,658 B2
(45) Date of Patent: Oct. 17, 2023

(54) PERIPHERAL COMPONENT INTERCONNECT EXPRESS (PCIE) INTERFACE SYSTEM AND METHOD OF OPERATING THE SAME

(71) Applicant: SK hynix Inc., Icheon-si (KR)

(72) Inventors: Yong Tae Jeon, Icheon-si (KR); Ji Woon Yang, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 13 days.

(21) Appl. No.: 17/522,810

(22) Filed: Nov. 9, 2021

(65) Prior Publication Data
US 2022/0326885 A1 Oct. 13, 2022

(30) Foreign Application Priority Data

Apr. 13, 2021 (KR) .................. 10-2021-0048080
Jun. 1, 2021 (KR) .................. 10-2021-0070686

(51) Int. Cl.
G06F 3/06 (2006.01)

(52) U.S. Cl.
CPC .......... *G06F 3/0659* (2013.01); *G06F 3/0604* (2013.01); *G06F 3/0625* (2013.01);
(Continued)

(58) Field of Classification Search
CPC .... G06F 3/0659; G06F 3/0604; G06F 3/0625; G06F 3/0634; G06F 3/0635; G06F 3/0679; G06F 3/0611; G06F 3/0688
See application file for complete search history.

(56) References Cited

U.S. PATENT DOCUMENTS 7,370,132 B1  5/2008  Huang et al.
9,146,892 B2  9/2015  Lindsay
(Continued)

FOREIGN PATENT DOCUMENTS

CN  111124975 A   5/2020
KR  100807443 B1  2/2008
(Continued)

OTHER PUBLICATIONS

Horner, R. "Using PCI Express L1 Sub-States to Minimize Power Consumption in Advanced Process Nodes." Semiconductor Engineering. Jul. 10, 2014. Cited in U.S. Appl. No. 17/522,827 Non-Final Office Action dated Jan. 25, 2023. <https://semiengineering.com/using-pci-express-l1-sub-states-to-minimize-power-consumption-in-advanced-process-nodes>.

(Continued)

*Primary Examiner* — Michelle T Bechtold
(74) *Attorney, Agent, or Firm* — Perkins Coie LLP

(57) ABSTRACT

A peripheral component interconnect express (PCIe) interface system is provided to include a PCIe interface device, a host, and a non-volatile memory express (NVMe) device connected to the host through the interface device. The host includes a host memory configured to store information on a command to be executed on the NVMe device and a command that has been executed on the NVMe device, and an NVMe driver configured to transmit the command to be executed on the NVMe device to the host memory, and output a doorbell signal indicating that the command to be executed on the NVMe device has been stored in the host memory to the NVMe device. The NVMe device requests to the host memory to register a lightweight notification (LN) indicating a position in which the command to be executed on the NVMe device is stored.

18 Claims, 13 Drawing Sheets

(52) U.S. Cl.
CPC .......... *G06F 3/0634* (2013.01); *G06F 3/0635* (2013.01); *G06F 3/0679* (2013.01)

(56) References Cited

U.S. PATENT DOCUMENTS

| | | |
|---|---|---|
| 9,183,171 B2 | 11/2015 | Iyer et al. |
| 9,454,213 B2 | 9/2016 | Bharadwaj et al. |
| 9,467,120 B1 | 10/2016 | Song |
| 9,760,311 B1 | 9/2017 | Amir |
| 10,152,280 B2 | 12/2018 | Ishiguro et al. |
| 10,963,035 B2 | 3/2021 | Mishra |
| 11,307,638 B2 | 4/2022 | Li |
| 2007/0047667 A1 | 3/2007 | Shumarayev |
| 2007/0050653 A1 | 3/2007 | Verdun |
| 2008/0288798 A1 | 11/2008 | Cooper |
| 2009/0103444 A1 | 4/2009 | Khatri et al. |
| 2009/0187683 A1 | 7/2009 | Adar et al. |
| 2010/0115174 A1 | 5/2010 | Akyol et al. |
| 2011/0173352 A1 | 7/2011 | Sela et al. |
| 2012/0221882 A1 | 8/2012 | Morrison et al. |
| 2013/0080660 A1 | 3/2013 | Lee |
| 2013/0173837 A1* | 7/2013 | Glaser ................. G06F 13/4282 711/108 |
| 2014/0019654 A1 | 1/2014 | Trivedi et al. |
| 2014/0032939 A1 | 1/2014 | Jeddeloh |
| 2014/0108840 A1 | 4/2014 | Imao |
| 2014/0195833 A1 | 7/2014 | Wang |
| 2014/0372777 A1 | 12/2014 | Reller et al. |
| 2015/0081955 A1* | 3/2015 | Vucinic ................... G06F 3/061 710/5 |
| 2015/0205539 A1 | 7/2015 | Moon |
| 2016/0188510 A1 | 6/2016 | Singh et al. |
| 2016/0210062 A1 | 7/2016 | McCambridge |
| 2016/0216758 A1 | 7/2016 | Kachare |
| 2017/0083252 A1 | 3/2017 | Singh |
| 2017/0269675 A1 | 9/2017 | Klacar et al. |
| 2017/0293451 A1* | 10/2017 | Pan ........................ G06F 3/061 |
| 2017/0300263 A1 | 10/2017 | Helmick |
| 2019/0042510 A1 | 2/2019 | Ngau |
| 2019/0250930 A1 | 8/2019 | Erez |
| 2019/0324659 A1 | 10/2019 | Benisty |
| 2019/0391936 A1 | 12/2019 | Stalley |
| 2020/0125157 A1* | 4/2020 | Kachare ................ G06F 1/3209 |
| 2020/0226091 A1 | 7/2020 | Harriman |
| 2020/0310517 A1 | 10/2020 | Li |
| 2020/0371578 A1 | 11/2020 | Murali |
| 2020/0371579 A1 | 11/2020 | Selvam |
| 2021/0055866 A1 | 2/2021 | Fujimoto |
| 2022/0011965 A1 | 1/2022 | Heller |
| 2022/0197519 A1 | 6/2022 | Kuo |
| 2022/0327073 A1 | 10/2022 | Jeon |
| 2022/0327074 A1 | 10/2022 | Jeon et al. |

FOREIGN PATENT DOCUMENTS

| | | |
|---|---|---|
| KR | 20100109446 A | 10/2010 |
| KR | 1020140113439 A | 9/2014 |
| KR | 1020160105209 A | 9/2016 |
| KR | 1020170124017 A | 11/2017 |
| KR | 20180049192 A | 5/2018 |
| KR | 20180121531 A | 11/2018 |
| WO | 2020155005 A1 | 8/2020 |

OTHER PUBLICATIONS

"PCI Express Base Specification." Revision 4.0, Version 0.3, Feb. 19, 2014, 53 pages.

* cited by examiner

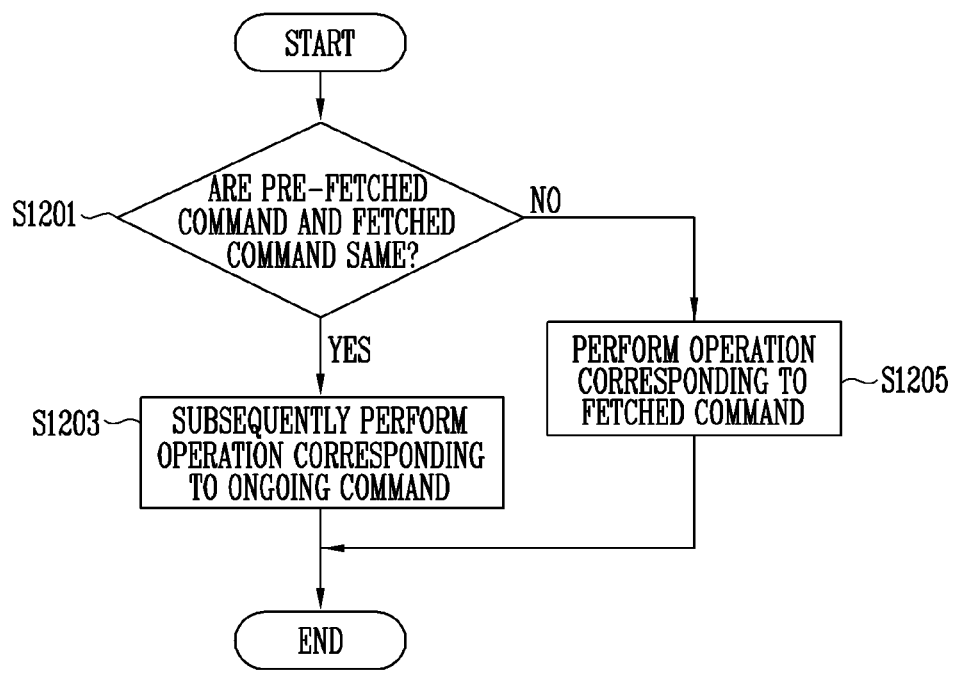

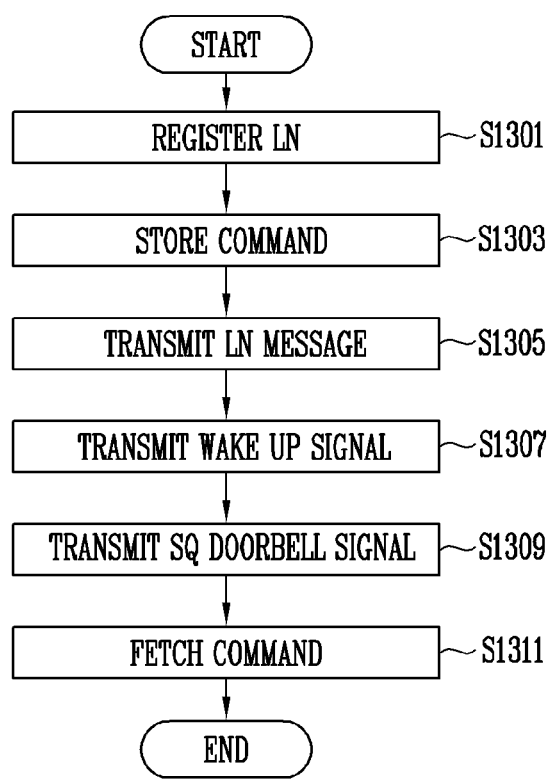

PERIPHERAL COMPONENT INTERCONNECT EXPRESS (PCIE) INTERFACE SYSTEM AND METHOD OF OPERATING THE SAME

CROSS-REFERENCE TO RELATED APPLICATION

This patent document claims priority to and benefits of the Korean patent application number 10-2021-0048080, filed Apr. 13, 2021, and Korean patent application number 10-2021-0070686, filed on Jun. 1, 2021, which are incorporated herein by reference in its entirety.

TECHNICAL FIELD

The technology and implementations disclosed in this patent document relates to an electronic device, and more particularly, to a PCIe interface system and a method of operating the same.

BACKGROUND

A peripheral component interconnect express (PCIe) is a serial structure of interface for data communication. A PCIe-based storage device supports multi-port and multi-function. The PCIe-based storage device may be virtualized and non-virtualized, and may achieve quality of service (QoS) of a host I/O command through one or more PCIe functions.

A storage device is a device that stores data under control of a host device such as a computer or a smartphone. A storage device may include a memory device in which data is stored and a memory controller controlling the memory device. The memory device is divided into a volatile memory device and a non-volatile memory device.

The volatile memory device is a device that stores data only when power is supplied and loses the stored data when the power supply is cut off. The volatile memory device includes a static random access memory (SRAM), a dynamic random access memory (DRAM), and the like.

The non-volatile memory device is a device that does not lose data even though power is cut off. The non-volatile memory device includes a read only memory (ROM), a programmable ROM (PROM), an electrically programmable ROM (EPROM), an electrically erasable and programmable ROM (EEPROM), a flash memory, and others.

SUMMARY

Various embodiments of the disclosed technology provide a PCIe interface system and a method of operating the same, which reduces a time to fetch a command by registering a PCIe lightweight notification (LN) and prefetching the command.

According to an embodiment of the present disclosure, a peripheral component interconnect express (PCIe) interface system is provided to include a PCIe interface device, a host, and a non-volatile memory express (NVMe) device connected to the host through the interface device. The host may include a host memory configured to store information on a command to be executed on the NVMe device and a command that has been executed on the NVMe device, and an NVMe driver configured to transmit the command to be executed on the NVMe device to the host memory, and output a doorbell signal indicating that the command to be executed on the NVMe device has been stored in the host memory to the NVMe device. The NVMe device is configured to request to the host memory to register a lightweight notification (LN) registration indicating a position in which the command to be executed on the NVMe device is stored.

According to an embodiment of the present disclosure, a method of operating a system is provided. The method includes requesting, by the system including a host having a host memory and a non-volatile memory express (NVMe) device connected to the host through a peripheral component interconnect express (PCIe) interface device, a PCIe lightweight notification (LN) registration indicating a position in which a command to be executed on the NVMe device is stored within a host memory included in the system, registering the LN, and storing the command to be executed on the NVMe device in the host memory.

According to the present technology, a PCIe interface system and a method of operating the same, which reduces a time to fetch a command by registering a PCIe lightweight notification (LN) and prefetching the command are provided.

BRIEF DESCRIPTION OF THE DRAWINGS

FIG. 12 is a diagram illustrating an operation of a PCIe interface system based on some implementations of the disclosed technology.

FIG. 13 is a diagram illustrating an operation of a PCIe interface system based on some implementations of the disclosed technology.

DETAILED DESCRIPTION

Figure 1:
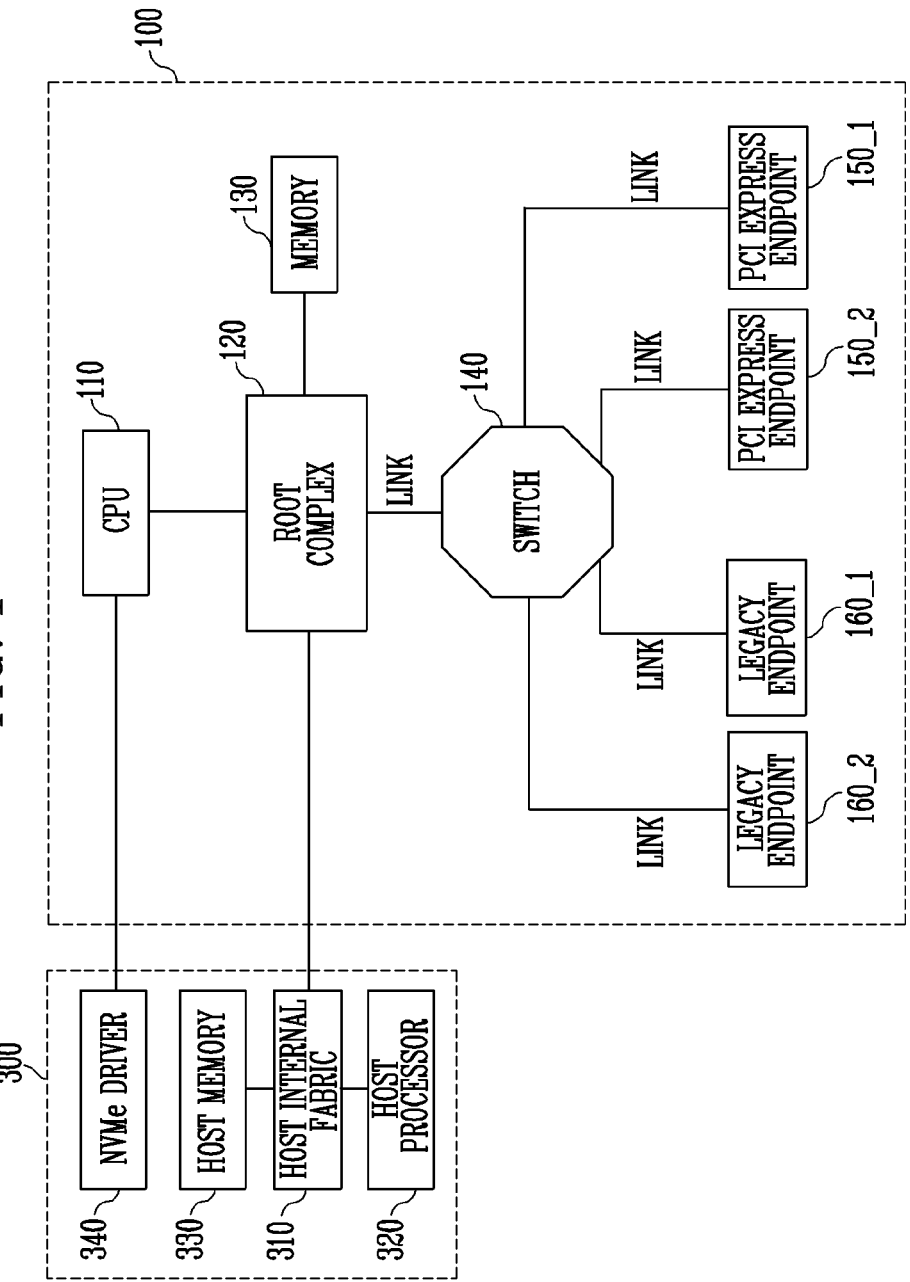
FIG. 1 is an example of a block diagram illustrating a peripheral component interconnect express (PCIe) interface system based on some implementations of the disclosed technology.

FIG. 1 is a block diagram illustrating a peripheral component interconnect express (PCIe) interface system.

Referring to FIG. 1, the PCIe interface device 100 of FIG. 1 may include a central processing unit 110, a root complex 120, a memory 130, a switch 140, PCIe end points 150_1 and 150_2, and legacy end points 160_1 and 160_2. In addition, the host 300 of FIG. 1 may include a host internal fabric 310, a host processor 320, a host memory 330, and an NVMe driver 340.

In FIG. 1, the root complex 120 may be connected to the switch 140 through a link LINK. In addition, the switch 140 may be connected to each of the PCIe end points 150_1 and 150_2 and the legacy end points 160_1 and 160_2 through the link LINK. The link LINK may be configured with at least one lane.

In an embodiment, the root complex 120 may connect the central processing unit 110 and the memory 130 to an I/O hierarchy. The root complex 120 may support a PCIe port. Thus, the root complex 120 may support a root port that may be connected to an input/output (I/O) device.

Additionally, the root complex 120 may support routing between hierarchies of each configuration included in the PCIe interface device 100. The routing may include an operation of selecting a path from a transmission side to a reception side in data communication. The routing may be performed based on any one of a method of setting the path from the transmission side to the reception side in advance or selecting the most efficient path according to a state of a system or a network.

In some implementations, the root complex 120 may support an input/output request. The root complex 120 needs to support generation of a configuration request. It is not allowed for the root complex 120 to support lock semantics as a completer. The root complex 120 may request generation of a lock request as a requester.

In an embodiment, the root complex 120 may divide a packet transmitted between hierarchies into smaller units during routing. In addition, the root complex 120 may generate the input/output request.

In an embodiment, the switch 140 may be configured with two or more logical PCI-to-PCI bridges. Each of the two or more logical PCI-to-PCI bridges may be connected to an upstream port or a downstream port.

The switch 140 may transmit a transaction using a PCI bridge mechanism (address-based multicasting method). At this time, the switch 140 needs to be capable of transmitting all types of transaction layer packets (TLPs) through the upstream port and the downstream port. In addition, the switch 140 needs to support a locked request. Each port of the enabled switch 140 must be capable of supporting flow control. When competition occurs in the same virtual channel, the switch 140 may arbitrate in a round robin or weighted round robin method.

In an embodiment, differently from the root complex 120, the switch 140 may not divide the packet transmitted between the hierarchies into smaller units.

In an embodiment, the PCIe end points 150_1 and 150_2 and the legacy end points 160_1 and 160_2 may serve as the requester or the completer of a PCIe transaction. The TLP transmitted and received by the PCIe end points 150_1 and 150_2 and the legacy end points 160_1 and 160_2 must provide a configuration space header. In addition, the PCIe end points 150_1 and 150_2 and the legacy end points 160_1 and 160_2 must provide a configuration request as the completer.

In an embodiment, the PCIe end points 150_1 and 150_2 and the legacy end points 160_1 and 160_2 may be distinguished according to a size of a memory transaction. For example, when a memory transaction exceeding 4 GB is possible, an end point may be the PCIe end points 150_1 and 150_2, and when a memory transaction exceeding 4 GB is impossible, the end point may be the legacy end points 160_1 and 160_2. The PCIe end points 150_1 and 150_2 must not generate the input/output request, but the legacy end points 160_1 and 160_2 may provide or generate the input/output request.

In an embodiment, the PCIe end points 150_1 and 150_2 or the legacy end points 160_1 and 160_2 may transmit and receive the TLP to and from the switch 140.

In an embodiment, the switch 140 may transmit the TLP received from the PCIe end points 150_1 and 150_2 or the legacy end points 160_1 and 160_2 to the root complex 120.

In an embodiment, the root complex 120 may transmit and receive the TLP to and from the PCIe end points 150_1 and 150_2 or the legacy end points 160_1 and 160_2 through the switch 140. The root complex 120 may transmit the TLP received from the PCIe end points 150_1 and 150_2 or the legacy end points 160_1 and 160_2 to the central processing unit 110 or the memory 130.

In an embodiment, the host processor 320 and the host memory 330 included in the host 300 may be connected to the root complex 120 through the host internal fabric 310.

In an embodiment, the host processor 320 may control a write operation or a read operation to be performed on a non-volatile memory express (NVMe) device connected to each of the PCIe end points 150_1 and 150_2 or the legacy end points 160_1 and 160_2. In some implementations, the NVMe device may be or include a solid state drive (SSD). In addition, the host processor 320 may store information necessary for controlling the write operation or the read operation to be performed on the NVMe device in the host memory 330.

In an embodiment, the NVMe driver 340 may be connected to the central processing unit 110 and allow the host 300 to control the NVMe device through the PCIe interface device 100.

Figure 2:
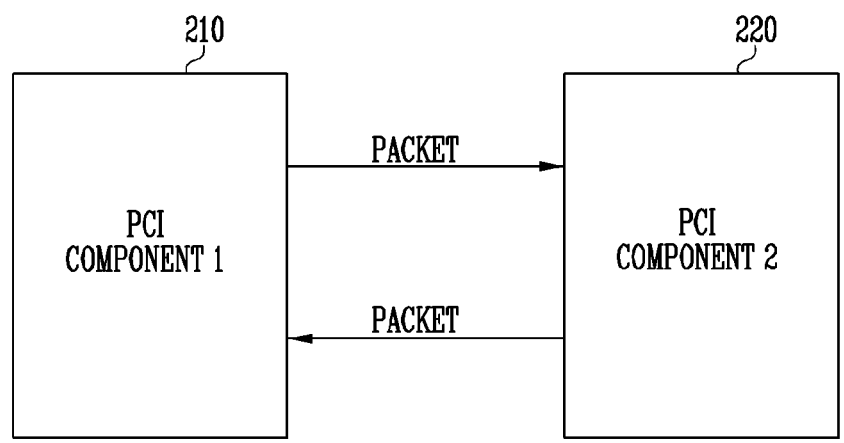
FIG. 2 is an example of a diagram illustrating packet transmission between configurations included in a PCIe interface device based on some implementations of the disclosed technology.

FIG. 2 is a diagram illustrating packet transmission between configurations included in the PCIe interface device.

Referring to FIGS. 1 and 2, the PCI components PCI COMPONENT 1 and 2 of FIG. 2 may be any one of the root complex 120, the switch 140, the PCIe end points 150_1 and 150_2, and the legacy end points 160_1 and 160_2 of FIG. 1. The PCI components PCI COMPONENT 1 and 2 of FIG. 2 may be any one of components connected by the link LINK. The link LINK may be configured with at least one lane.

In an embodiment, the PCI components PCI COMPONENT 1 and 2 may transmit and receive a packet PACKET through the link LINK. Each of the PCI components PCI COMPONENT 1 and 2 may operate as a transmitter (TX) transmitting the packet PACKET or a receiver (RX) receiving the packet PACKET.

In an embodiment, the packet PACKET may be an information transmission unit that includes a selective TLP prefix, a header, and a data payload.

In an embodiment, a packet PACKET that does not need to be cached is not snooped, thereby reducing latency. When dependence does not exist between transactions, operation performance of the packet PACKET can be improved by changing ordering. In addition, operation performance of the packet PACKET can be improved by changing the ordering based on an ID.

Figure 3:
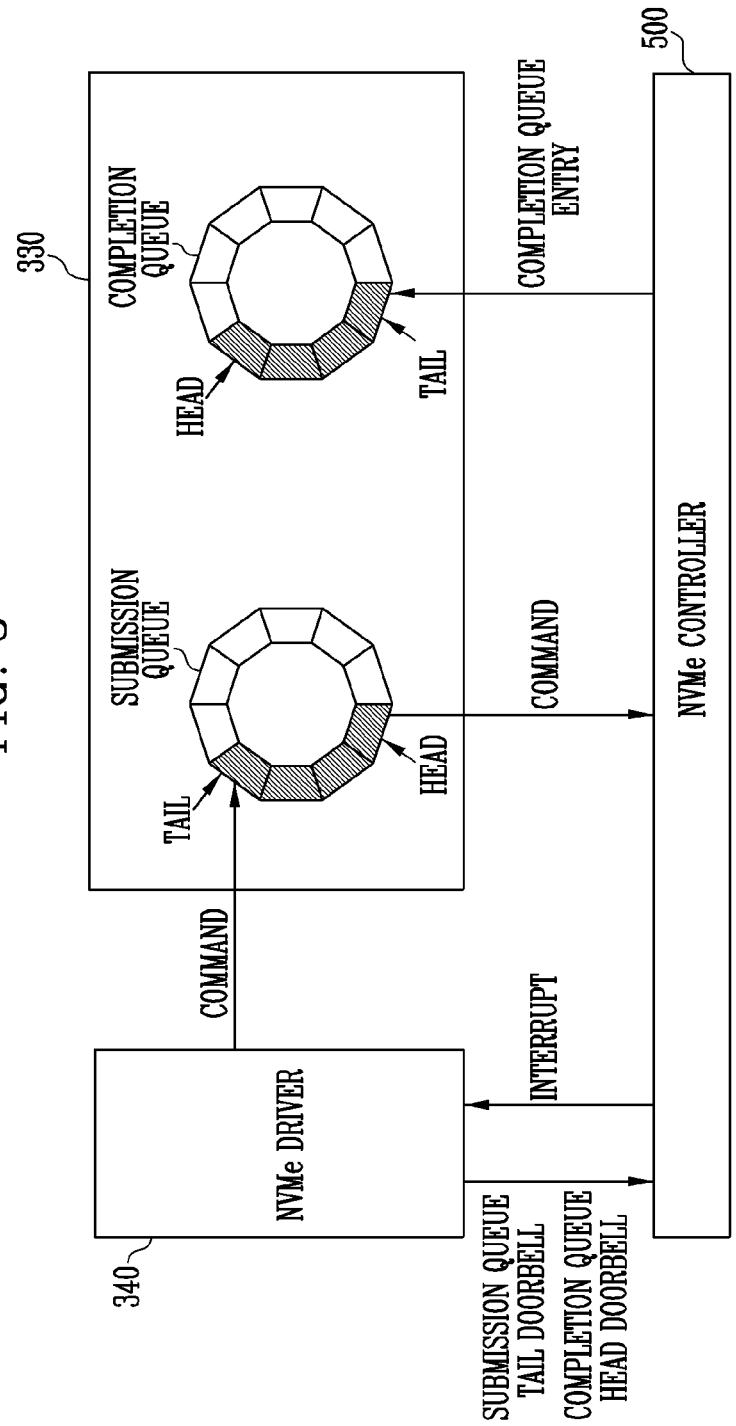
FIG. 3 is a diagram illustrating an example of a command process in an NVMe based on some implementations of the disclosed technology.

FIG. 3 is a diagram illustrating a command process in the NVMe.

Referring to FIGS. 1 and 3, FIG. 3 shows a process in which the command is executed on the NVMe device connected to each of the PCIe end points 150_1 and 150_2 or the legacy end points 160_1 and 160_2 through the NVMe driver 340 and host memory 330 included in the host 300 of FIG. 1. The NVMe device may include an NVMe controller 500. In FIG. 3, the host memory 330 may include a SUBMISSION QUEUE (SQ) and a COMPLETION QUEUE (CQ).

In an embodiment, the NVMe driver 340 may transmit the command COMMAND to be executed on the NVMe device to the SUBMISSION QUEUE. The SUBMISSION QUEUE may queue the command received from the NVMe driver 340. For example, the host memory 330 may sequentially queue the received command from HEAD to TAIL of the SUBMISSION QUEUE.

When the command COMMAND is queued in the SUBMISSION QUEUE, the NVMe driver 340 may output a SUBMISSION QUEUE TAIL DOORBELL signal to the NVMe controller 500. The NVMe controller 500 may receive the SUBMISSION QUEUE TAIL DOORBELL signal and store SUBMISSION QUEUE TAIL ENTRY POINTER in a register. Here, the SUBMISSION QUEUE TAIL ENTRY POINTER may be an indicator indicating the command queued in a TAIL portion of the SUBMISSION QUEUE among the commands queued in the SUBMISSION QUEUE. The NVMe controller 500 may store SUBMISSION QUEUE TAIL ENTRY POINTER in the register to identify a new command output from the host memory 330.

Thereafter, the NVMe controller 500 may fetch the command from the host memory 330. The NVMe controller 500 may receive the commands queued in the SUBMISSION QUEUE. The NVMe controller 500 may perform an operation corresponding to the received commands.

In an embodiment, after the NVMe controller 500 performs the operation corresponding to the commands, COMPLETION QUEUE ENTRY may be transmitted to the host memory 330. The COMPLETION QUEUE ENTRY may include information on the most recently executed command by the NVMe controller 500. The host memory 330 may queue the received COMPLETION QUEUE ENTRY in the COMPLETION QUEUE. For example, the host memory 330 may sequentially queue the received COMPLETION QUEUE ENTRY from the HEAD to the TAIL of the COMPLETION QUEUE.

Thereafter, the NVMe controller 500 may output an INTERRUPT signal to the NVMe driver 340. The INTERRUPT signal may be a signal indicating that the COMPLETION QUEUE ENTRY has been queued in the COMPLETION QUEUE.

When receiving the INTERRUPT signal, the NVMe driver 340 may perform an operation based on the COMPLETION QUEUE ENTRY of the COMPLETION QUEUE. When the NVMe driver 340 completes the operation, the NVMe driver 340 may output a COMPLETION QUEUE HEAD DOORBELL signal to the NVMe controller 500. The NVMe controller 500 may receive the COMPLETION QUEUE HEAD DOORBELL signal and store the COMPLETION QUEUE HEAD ENTRY POINTER in the register. Here, the COMPLETION QUEUE HEAD ENTRY POINTER may be an indicator indicating an entry queued in a HEAD portion of the COMPLETION QUEUE among entries queued in the COMPLETION QUEUE. The NVMe controller 500 may store the COMPLETION QUEUE HEAD ENTRY POINTER in the register in order to identify the command whose corresponding operation has been completed.

Figure 4:
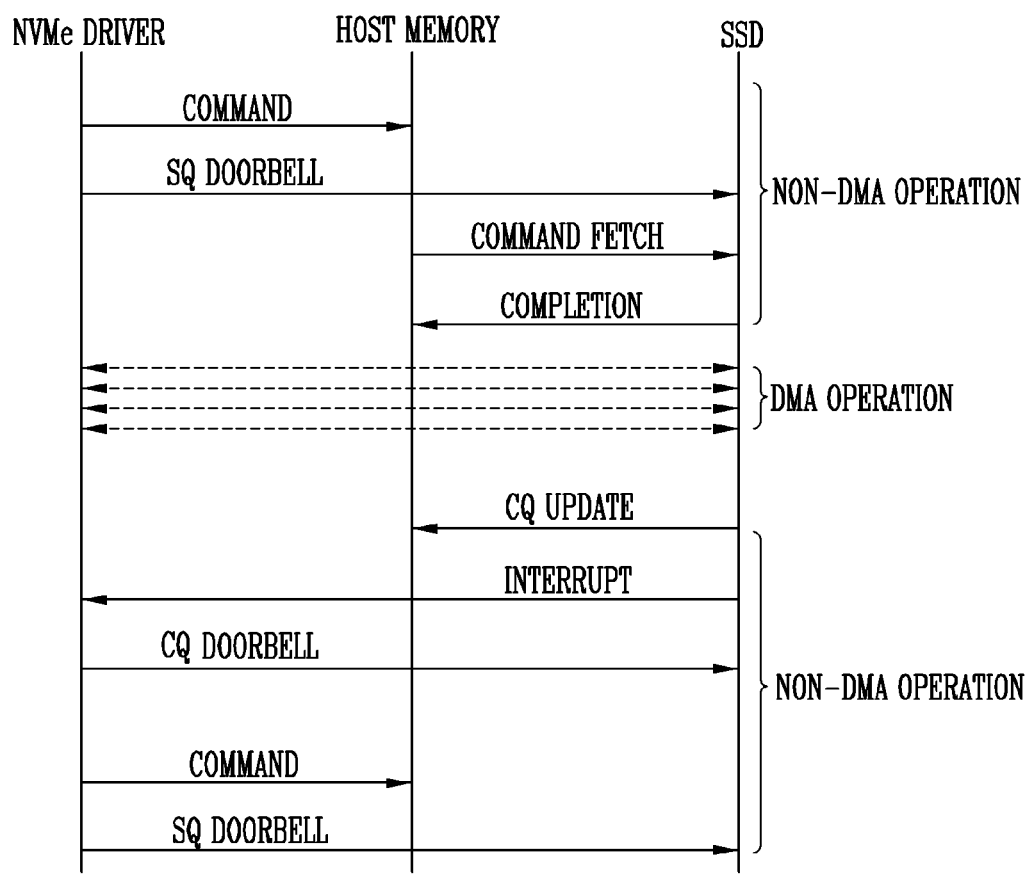
FIG. 4 is a diagram illustrating an example of a command process of FIG. 3.

FIG. 4 is a diagram illustrating the command process of FIG. 3.

FIG. 4 shows operations of the NVMe driver 340, the host memory 330, and the SSD. The SSD corresponds to one of the NVMe devices connected to the PCIe end points 150_1 and 150_2 or the legacy end points 160_1 and 160_2 of FIG. 3.

In FIG. 4, a non-DMA (direct access memory) operation may refer to an operation performed by the central processing unit 110 of FIG. 1, and a DMA (direct access memory) operation may refer to an operation performed independently without intervention of the central processing unit 110 of FIG. 1.

In an embodiment, the NVMe driver 340 outputs the command COMMAND to be executed on the SSD to the host memory 330, and the host memory 330 may sequentially queue the received command from the HEAD to the TAIL of the SUBMISSION QUEUE.

Thereafter, the NVMe driver 340 may output the SQ DOORBELL signal to the SSD. The SQ DOORBELL signal may be the same signal as the SUBMISSION QUEUE TAIL DOORBELL signal of FIG. 3. That is, the NVMe driver 340 may output the SQ DOORBELL signal to the SSD so that a new command output from the host memory 330 is identified.

In an embodiment, the SSD may fetch the command from the host memory 330. That is, the SSD may receive the commands queued in the SUBMISSION QUEUE from the host memory 330 and perform operations corresponding to the received commands. When the SSD completes the operations corresponding to the commands received from the host memory 330, the SSD may output a COMPLETION signal to the host memory 330.

Thereafter, the NVMe driver 340 and the SSD may perform the DMA operation independently performed without intervention of the central processing unit 110 of FIG. 1.

In an embodiment, after the SSD performs the operation corresponding to the commands, COMPLETION QUEUE of the host memory 330 may be updated (CQ UPDATE). That is, after the SSD performs the operation corresponding to the commands, COMPLETION QUEUE ENTRY may be transmitted to the host memory 330, and the host memory 330 may sequentially queue the received COMPLETION QUEUE ENTRY from the HEAD to the TAIL of the COMPLETION QUEUE.

Thereafter, the SSD may output the INTERRUPT signal to the NVMe driver 340. The INTERRUPT signal may be a signal indicating that the COMPLETION QUEUE ENTRY is queued in the COMPLETION QUEUE.

In an embodiment, when the operation performed by the NVMe driver 340 based on the COMPLETION QUEUE ENTRY of the COMPLETION QUEUE is completed, the NVMe driver 340 may output a CQ DOORBELL signal to the SSD. The CQ DOORBELL signal may be the same signal as the COMPLETION QUEUE HEAD DOORBELL signal of FIG. 3. That is, the NVMe driver 340 may output the CQ DOORBELL signal to the SSD so that the command of which the operation is completed is identified.

Thereafter, the NVMe driver 340 may output a new command COMMAND to be executed on the SSD to the host memory 330, and output the SQ DOORBELL signal to the SSD so that the new command output from the host memory 330 is identified.

Among the operations described above, operations except for the DMA operation may be the non-DMA operation. Referring to FIG. 4, it is noted that more non-DMA operation is performed than the DMA operation. Since it takes more time to process the non-DMA operation, there is a need for an implementation that can reduce the time to process the non-DMA operation. In order to reduce the time consumed for the non-DMA operation, a method of performing the non-DMA operation through a lightweight notification (LN) will be discussed below.

Figure 5:
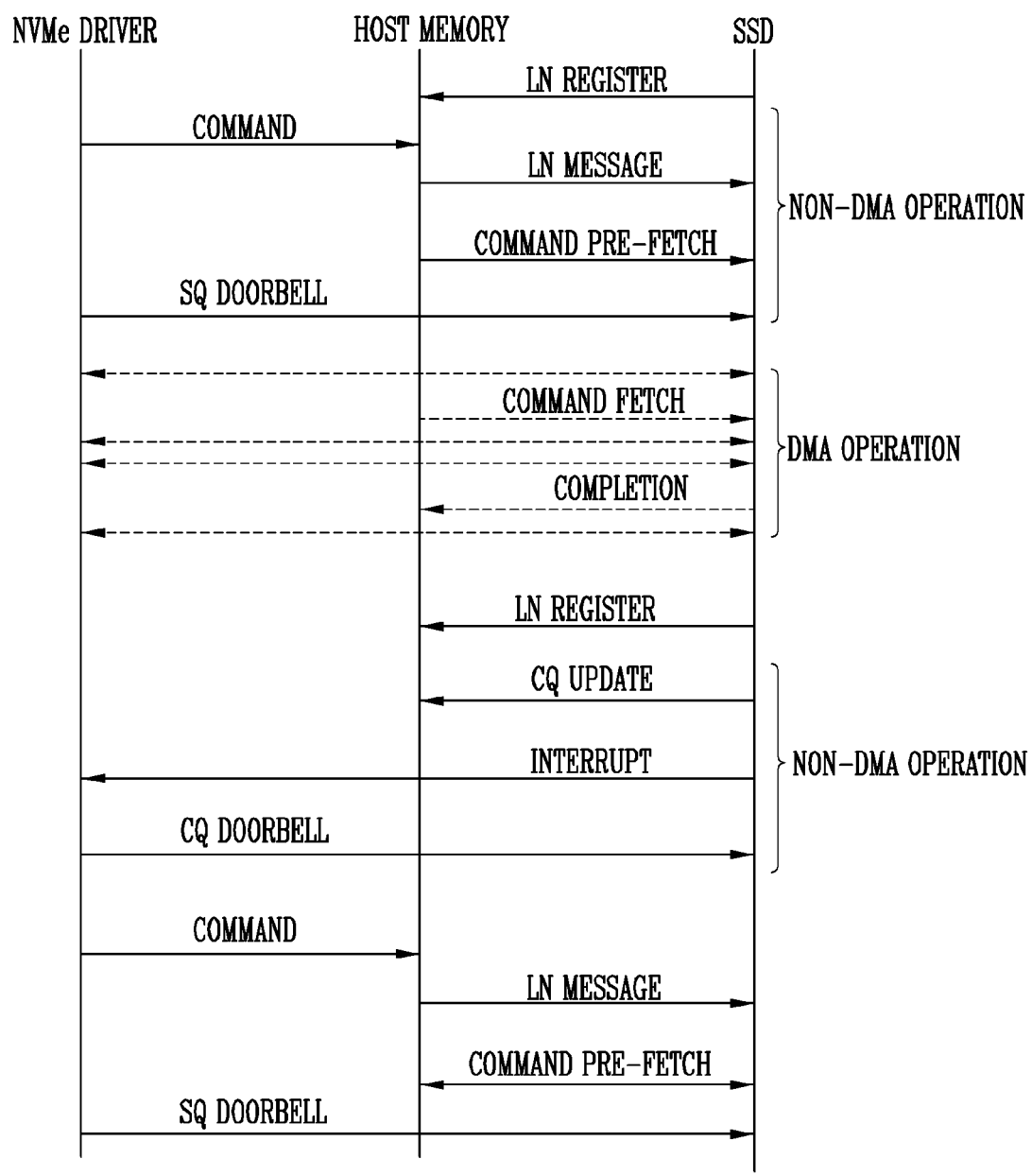
FIG. 5 is a diagram illustrating an example of a command process performed through an LN based on some implementations of the disclosed technology.

FIG. 5 is a diagram illustrating a command process performed through a LN.

FIG. 5 shows operations of the NVMe driver 340, the host memory 330, and the SSD of FIG. 4 based on a PCIe lightweight notification (LN). The LN may indicate a specific address of the host memory 330 and may be included in a header of a transaction layer packet (TLP). In addition, the LN may be registered in a cache line of the root complex 120 of FIG. 1.

In FIG. 5, the non-DMA operation refers to the operation performed by the central processing unit 110 of FIG. 1, and the DMA operation may refer to the operation independently performed without intervention of the central processing unit 110 of FIG. 1.

In an embodiment, the SSD may register the LN in the host memory 330 and the cache line of the root complex 120 of FIG. 1. At this time, the LN may indicate a position at which the command is queued in the host memory 330.

When the LN is registered in the host memory 330 and the cache line of the root complex 120 of FIG. 1, the NVMe driver 340 may output the command to be executed on the SSD to the host memory 330, and the host memory 330 may sequentially queue the received command from the HEAD to the TAIL of the SUBMISSION QUEUE.

In an embodiment, when the command COMMAND is queued in the host memory 330, the host memory 330 may output an LN message to the SSD. The LN message may indicate a position in which the command COMMAND is queued in the host memory 330. The host memory 330 may output a changed position to the SSD through the LN message when the position in which the command COMMAND is queued is changed.

In an embodiment, the SSD may pre-fetch the command (COMMAND PRE-FETCH). For example, the SSD may receive the commands queued in the SUBMISSION QUEUE from the host memory 330. The command queued in the SUBMISSION QUEUE may be updated before the NVMe driver 340 outputs the SQ DOORBELL signal, and the host memory 330 may output the LN message to the SSD before the SQ DOORBELL signal is output. Thus, the SSD can prepare an execution of the command in advance through the pre-fetch of the command. Furthermore, since command information is stored in the cache line of the root complex 120 of FIG. 1, the command can be quickly fetched to increase an operation speed of the SSD.

Thereafter, the NVMe driver 340 may output the SQ DOORBELL signal to the SSD. The SQ DOORBELL signal may be the same signal as the SUBMISSION QUEUE TAIL DOORBELL signal of FIG. 3. The NVMe driver 340 may output the SQ DOORBELL signal to the SSD so that the new command output from the host memory 330 is identified. The SSD may perform an operation corresponding to the pre-fetched command based on the SQ DOORBELL signal.

After receiving the SQ DOORBELL signal, the SSD may fetch the command from the host memory 330 (COMMAND FETCH). When the SSD fetches the command, the LN registration may be released. The SSD may perform an operation based on a result of comparing the pre-fetched command and the fetched command.

For example, when the pre-fetched command and the fetched command are the same, the SSD may continuously perform the operation corresponding to the pre-fetched command. However, when the pre-fetched command and the fetched command are different, the SSD may stop the operation corresponding to the pre-fetched command and perform an operation corresponding to the fetched command.

When the SSD completes the operations corresponding to the commands received from the host memory 330, the SSD may output the COMPLETION signal to the host memory 330.

In an embodiment, the operation of fetching the command from the host memory 330 and the operation of outputting the COMPLETION signal to the host memory 330 by the SSD may be the non-DMA operation performed through the central processing unit 110 of FIG. 1. Since the above non-DMA operations are operations performed between the DMA operations, data input/output random performance can be improved. The input/output random performance may mean random performance of data of a specific size per command.

Thereafter, the SSD may register the LN indicating the position at which a next command is queued in the host memory 330 and the cache line of the root complex 120 of FIG. 1.

In an embodiment, after the SSD performs the operation corresponding to the commands, the COMPLETION QUEUE of the host memory 330 may be updated (CQ UPDATE). After the CQ UPDATE, the SSD may output the INTERRUPT signal indicating that the COMPLETION QUEUE ENTRY has been queued in the COMPLETION QUEUE to the NVMe driver 340. When the operation performed by the NVMe driver 340 based on the COMPLETION QUEUE ENTRY of the COMPLETION QUEUE in response to the INTERRUPT signal is completed, the NVMe driver 340 may output the CQ DOORBELL signal to the SSD.

In an embodiment, the NVMe driver 340 may further perform an operation of outputting the command COMMAND to be performed on the SSD to the host memory 330.

As a result, by registering the LN in the host memory 330 and pre-fetching the command, a time to fetch the command can be shortened and the input/output random performance of the SSD can be improved.

Figure 6:
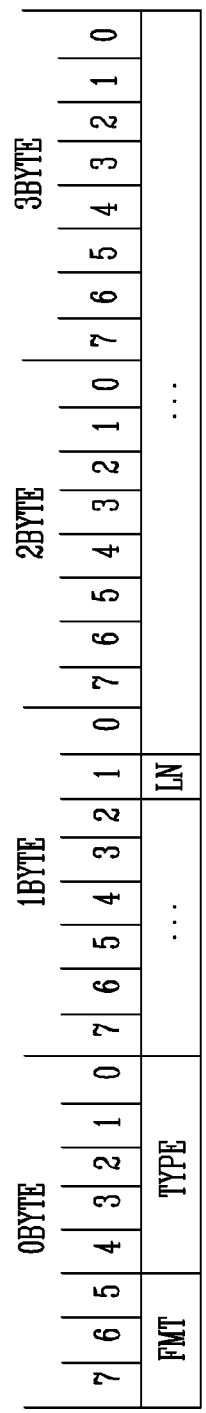
FIG. 6 is a diagram illustrating an example of a LN based on some implementations of the disclosed technology.

FIG. 6 is a diagram illustrating the LN.

FIG. 6 shows a portion of a TLP header.

In an embodiment, the TLP header may include 0 to 3 BYTE, and each BYTE may include 0 to 8 BIT. Various information may be included in 0 to 3 BYTE of the TLP header.

In an embodiment, 0 BYTE of the TLP header may include FMT information indicating a TLP format and TYPE information indicating a type of the TLP. For example, the FMT information may be included in 7 to 5 BIT of 0 BYTE, and the TYPE information may be included in 4 to 0 BIT of 0 BYTE.

In an embodiment, LN information may be included in 1 BIT of 1 BYTE of the TLP header. The LN may be a protocol that supports notification to an end point through a hardware mechanism when the cache line is updated. When 1 BIT of 1 BYTE is '1', the LN information may indicate completion of the operation.

Referring to FIG. 5, before the NVMe driver 340 outputs the command to the host memory 330, the LN may be registered in the host memory 330. At this time, 1 BIT of 1 BYTE of the TLP header may be set to '1'. That is, before the NVMe driver 340 outputs the SQ DOORBELL signal to the SSD, the position at which the command is queued may be LN-registered, and when the SSD receives the LN message, the SSD may pre-fetch the command queued in the host memory 330.

Thereafter, when the NVMe driver 340 outputs the SQ DOORBELL signal to the SSD, when the SSD fetches the command again, 1 BIT of 1 BYTE of the TLP header may be set to '0', and the LN registration may be released.

Figure 7:
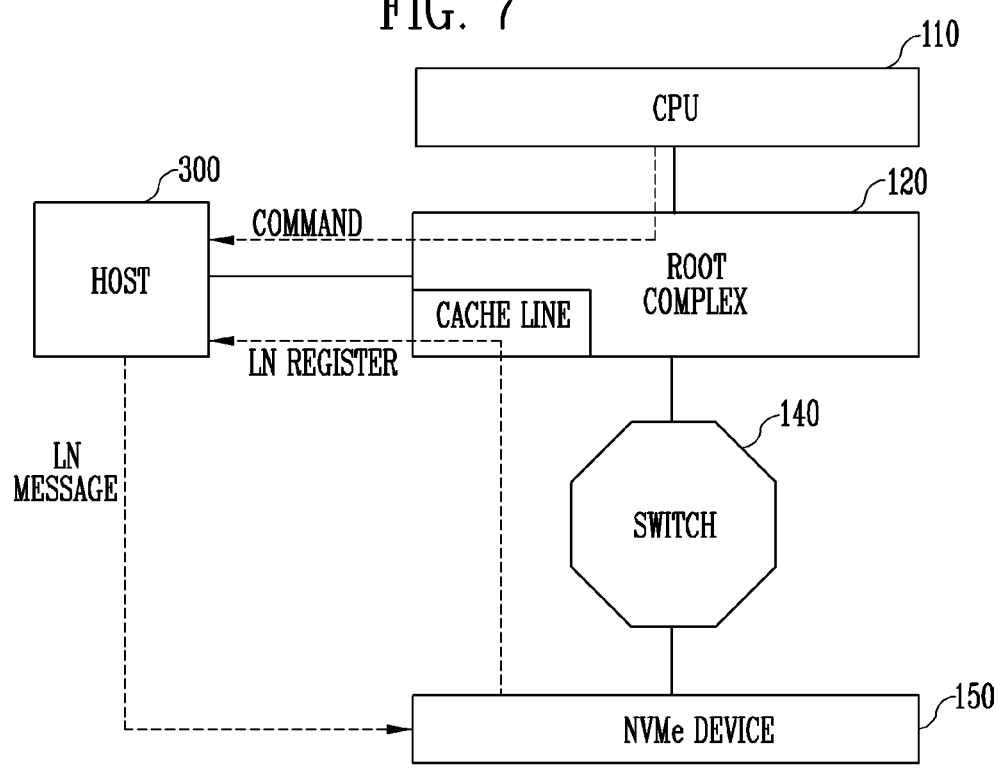
FIG. 7 is a diagram illustrating an example of an LN registration based on some implementations of the disclosed technology.

FIG. 7 is a diagram illustrating the LN registration.

FIG. 7 shows a host 300, a central processing unit 110, a root complex 120, a switch 140, and an NVMe device 150 connected to any one of the PCIe end points 150_1 and 150_2, and the legacy end points 160_1 and 160_2 of FIG. 1. In some implementations, the NVMe device 150 may be an SSD.

In an embodiment, when the host 300 transmits the command to the NVMe device 150, the host 300 may store the command information in the host memory 330 of FIG. 1, and then transmit the SQ DOORBELL signal to the NVMe device 150. At this time, an address at which the command information is stored in the host memory 330 of FIG. 1 may be fixed. In some implementations of the disclosed technology, this address may be LN-registered in the host 300 and the cache line CACHE LINE of the root complex 120 of FIG. 1 (LN REGISTER).

In an embodiment, before the host 300 transmits the command to the NVMe device 150, the LN may be registered. When the LN is registered, the host 300 may store the command information in the host memory 330 of FIG. 1 and output the LN message to the NVMe device 150 simultaneously. Thus, the host 300 may notify the NVMe device 150 that the command information is updated in the host memory 330 of FIG. 1 through the LN message. Thereafter, the host 300 may output the SQ DOORBELL signal to the NVMe device 150.

As a result, by outputting the LN message before the host 300 outputs the SQ DOORBELL signal to the NVMe device 150, the NVMe device 150 can check an occurrence of the new command in advance.

Figure 8:
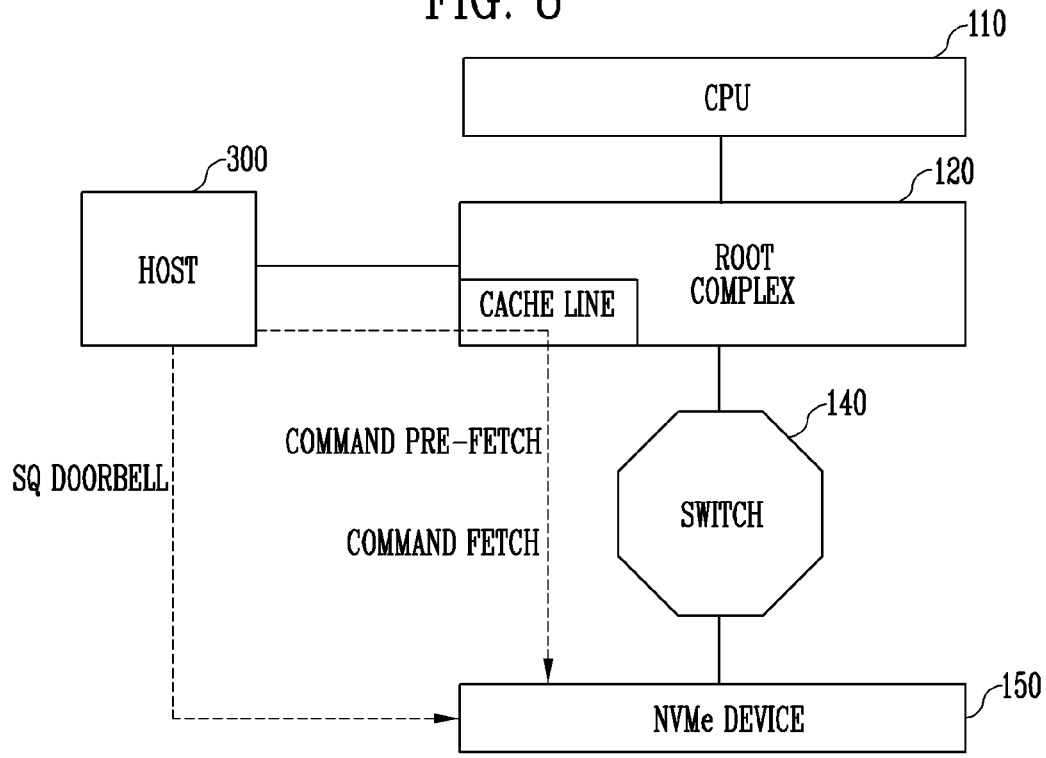
FIG. 8 is a diagram illustrating examples of command pre-fetch and command fetch after an LN registration based on some implementations of the disclosed technology.

FIG. 8 is a diagram illustrating command pre-fetch and command fetch after the LN registration.

FIG. 8 shows an operation after the host 300 outputs the LN message to the NVMe device 150 as discussed in FIG. 7.

In an embodiment, the NVMe device 150 may pre-fetch the command stored in the host memory 330 of FIG. 1 before receiving the SQ DOORBELL signal. Specifically, the NVMe device 150 may pre-fetch the command through the cache line CACHE LINE of the root complex 120 of FIG. 1. The NVMe device 150 may check whether the new command is generated based on the LN message, and pre-fetch the command stored in the host memory 330 of FIG. 1 before receiving the SQ DOORBELL signal.

In an embodiment, by pre-fetching the command stored in the host memory 330 of FIG. 1, the time consumed to fetch the command may be reduced. Therefore, the input/output random performance may be improved. The input/output random performance may mean the random performance of data of a specific size per command.

In addition, in this case, after receiving the SQ DOORBELL signal, the NVMe device 150 may fetch the command stored in the host memory 330 of FIG. 1 again (COMMAND FETCH).

In an embodiment, when the pre-fetched command and the fetched command are the same, the NVMe device 150 may perform pre-fetching and continuously perform the operation corresponding to the command which is being executed. However, when the pre-fetched command and the fetched command are different, the NVMe device 150 may stop the operation corresponding to the pre-fetched command and perform the operation corresponding to the newly fetched command.

Figure 9:
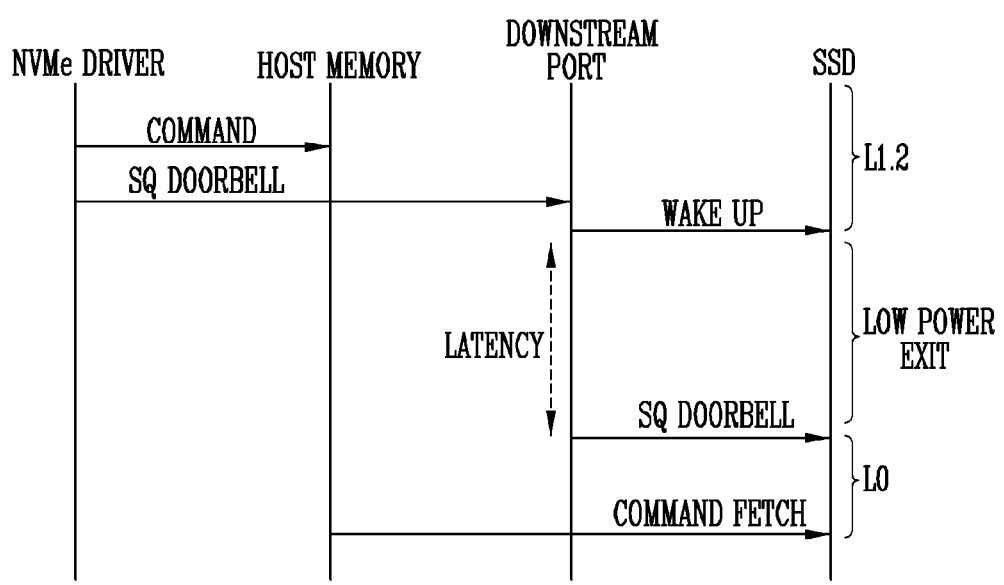
FIG. 9 is a diagram illustrating latency at an end of a low power state based on some implementations of the disclosed technology.

FIG. 9 is a diagram illustrating latency at an end of the low power state.

FIG. 9 shows operations of the NVMe driver 340, the host memory 330, which are shown in FIG. 3, and a SSD. The SSD corresponds to one of the NVMe devices connected to the downstream port DOWNSTREAM PORT of the switch 140 of FIG. 1, and the PCIe end points 150_1 and 150_2 or the legacy end points 160_1 and 160_2. Here, the downstream port DOWNSTREAM PORT may be a port that is located relatively further from the root complex 120 as compared to an upstream port of the switch 140.

In FIG. 9, the SSD may be in an L1.2 state. The L1.2 state may mean the low power state. In order to prevent power consumption, the SSD may be in the L1.2 state.

In FIG. 9, an L0 state may be a state in which power may be managed, and may be a state in which data and a control packet may be normally transmitted and received. For example, in the L0 state, a transaction layer packet (TLP) and a data link layer packet (DLLP) may be transmitted and received. The SSD may stop an operation in the L1.2 state and resume the operation in the L0 state.

In an embodiment, the NVMe driver 340 may output the command COMMAND to be executed on the SSD to the host memory 330, and the host memory 330 may queue the received command. Thereafter, the NVMe driver 340 may output the SQ DOORBELL signal indicating that the new command is queued in the SSD through the downstream port DOWNSTREAM PORT.

However, since the SSD is initially in the L1.2 state, a wake up signal may be output to the SSD from the downstream port DOWNSTREAM PORT. According to the wake up signal, the SSD may be changed from the L1.2 state to the L0 state (LOW POWER EXIT), and the SSD may be in a state in which the operation may be performed again. At this time, latency LATENCY may occur until the state of the SSD is changed from the L1.2 state to the L0 state.

When the SSD is in a state in which the operation may be performed, the SQ DOORBELL signal received from the NVMe driver 340 may be output to the SSD from the downstream port DOWNSTREAM PORT.

Thereafter, in the L0 state, the SSD may fetch the command from the host memory 330. The SSD may receive the commands queued in the SUBMISSION QUEUE from the host memory 330 and perform the operations corresponding to the received commands.

In order to minimize an occurrence of the latency LATENCY until the state of the SSD is changed from the L1.2 state to the L0 state, some implementations of the disclosed technology suggest a method of ending the low power state by LN-registering the position in which the command is stored.

Figure 10:
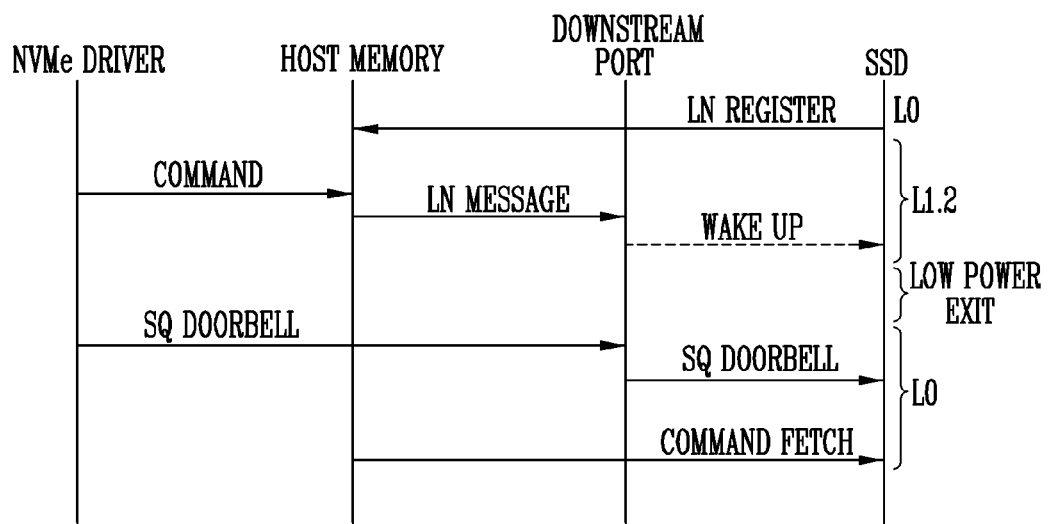
FIG. 10 is a diagram illustrating an end of the low power state through the LN registration based on some implementations of the disclosed technology.

FIG. 10 is a diagram illustrating the end of the low power state through the LN registration.

FIG. 10 shows the operation of the NVMe driver 340 and the host memory 330, which are shown in FIG. 3, and a SSD. The SSD corresponds to one of the NVMe devices connected to the downstream port DOWNSTREAM PORT of the switch 140 of FIG. 1, and the PCIe end points 150_1 and 150_2 or the legacy end points 160_1 and 160_2. Here, the downstream port DOWNSTREAM PORT may be a port that is located relatively further from the root complex 120 as compared to an upstream port of the switch 140.

In FIG. 10, the SSD may be in an L1.2 state. The L1.2 state may mean the low power state. In order to prevent power consumption, the SSD may be in the L1.2 state.

In FIG. 10, an L0 state may be a state in which power may be managed, and may be a state in which data and a control packet may be normally transmitted and received. For example, in the L0 state, a transaction layer packet (TLP) and a data link layer packet (DLLP) may be transmitted and received. The SSD may stop an operation in the L1.2 state and resume the operation in the L0 state.

However, differently from FIG. 9, in FIG. 10, by registering the LN in the host memory 330, the state of the SSD can be changed from the L1.2 state to the L0 state.

In an embodiment, before the NVMe driver 340 transmits the command to the NVMe device 150, the LN can be registered in the host memory 330 in the L0 state (LN REGISTER). At this time, the LN may indicate an address in which the command information is stored in the host memory 330.

When LN is registered, in the L1.2 state, the NVMe driver 340 may store the command information in the host memory 330 and the LN message may be output from the host memory 330 to the downstream port DOWNSTREAM PORT simultaneously. Thus, the LN message for informing the downstream port DOWNSTREAM PORT that the new command is queued in the host memory 330 may be output.

In an embodiment, the wake up signal may be output from the downstream port DOWNSTREAM PORT to the SSD based on the LN message. According to the wake up signal, the SSD may be changed from the L1.2 state to the L0 state (LOW POWER EXIT), which allows the SSD to be in a state capable of resuming the operation.

At this time, since the wake up signal is output based on the LN message before the SQ DOORBELL signal is output, it is possible to reduce time spent for the SSD to change its state from the L1.2 state to the L0 state.

Thereafter, when the SSD is in a state capable of resuming the operation, the SQ DOORBELL signal received from the NVMe driver 340 may be output to the SSD from the downstream port DOWNSTREAM PORT. In the L0 state, the SSD may fetch the command from the host memory 330.

Figure 11:
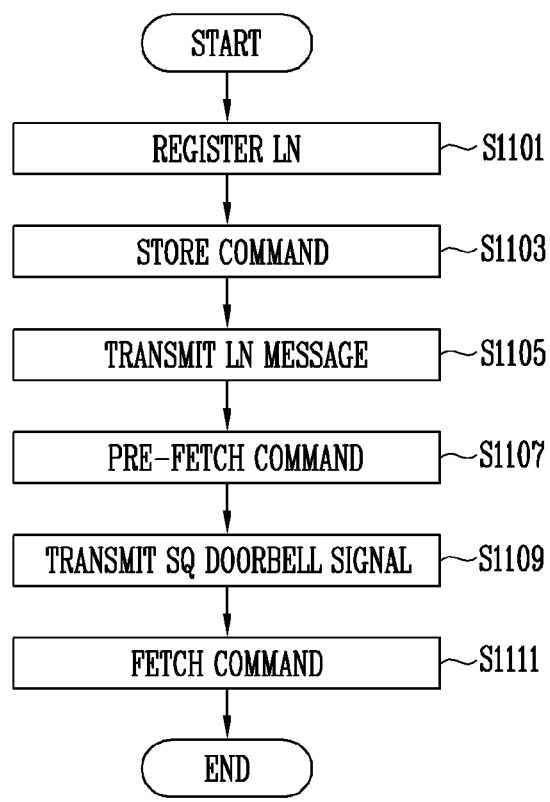
FIG. 11 is a diagram illustrating an operation of a PCIe interface system based on some implementations of the disclosed technology.

FIG. 11 is a diagram illustrating an operation of a PCIe interface system based on some implementations of the disclosed technology.

Referring to FIG. 11, in step S1101, the host may register the LN. The LN may indicate the address corresponding to a location where the command information is stored in the host memory of the host.

In step S1103, the host may store the command to be executed on the SSD. For example, the host may sequentially queue the command from the HEAD to the TAIL of the SUBMISSION QUEUE in the host memory.

In step S1105, the host may transmit the LN message to the SSD. That is, the host may indicate the position at which the new command is queued in the host memory. That is, the host may output the changed position to the SSD through the LN message when the position at which the command is queued is changed.

In step S1107, the SSD may pre-fetch the command queued in the host memory. When the SSD receives the LN message, the SSD may prepare to execute the command in advance through the pre-fetch of the command.

In step S1109, the host may transmit the SQ DOORBELL signal to the SSD. Thus, the host may output the SQ DOORBELL signal to the SSD so that the new command output from the host memory is identified. The SSD may perform the operation corresponding to the pre-fetched command based on the SQ DOORBELL signal.

In step S1111, the SSD may re-fetch the command queued in the host memory. For example, while the SSD performs the operation corresponding to the pre-fetched command, the command queued in the host memory may be fetched again. The SSD may perform the operation based on a result of comparing the pre-fetched command and the fetched command.

FIG. 12 is a diagram illustrating an operation of a PCIe interface system based on some implementations of the disclosed technology.

FIG. 12 shows steps after step S1111 of FIG. 11.

In step S1201, the SSD may determine whether the pre-fetched command and the fetched command are the same. The SSD may fetch the command again while performing the operation corresponding to the pre-fetched commands, and may compare the pre-fetched command and the fetched command.

When the pre-fetched command and the fetched command are the same (Y), the operation may proceed to step S1203, and the SSD may subsequently perform the operation corresponding to the ongoing command.

However, when the pre-fetched command and the fetched command are different (N), the operation may proceed to step S1205, and the SSD may stop the operation corresponding to the ongoing command and perform the operation corresponding to the newly fetched command.

FIG. 13 is a diagram illustrating an operation of a PCIe interface system based on some implementations of the disclosed technology.

Referring to FIG. 13, in step S1301, the host may register the LN. The LN may indicate the address where the command information is stored in the host memory included in the host. At this time, the SSD may be in the L0 state. The L0 state may be a state in which power may be managed, and may be a state in which the data and the control packet are normally transmitted and received.

In step S1303, the host may store the command to be executed on the SSD. For example, the host may sequentially queue the command from the HEAD to the TAIL of the SUBMISSION QUEUE in the host memory. At this time, the SSD may be in the L1.2 state which is the low power state.

In step S1305, the host may transmit the LN message to the SSD through the downstream port. The LN message for informing the downstream port that the new command is queued in the host memory may be output. Here, the downstream port may be the port of the switch that is located relatively further from the root complex among the configurations included in the PCIe interface device.

In step S1307, the wake up signal output from the downstream port may be transmitted to the SSD. In order to change the state of the SSD from the L1.2 state to the L0 state, that is, the state in which the operation may be performed, the wake up signal may be output from the downstream port. According to the wake up signal, the SSD may be changed from the L1.2 state to the L0 state (LOW POWER EXIT), and the SSD may be in a state capable of performing the operation again.

In step S1309, the host may transmit the SQ DOORBELL signal to the SSD through the downstream port. When the SSD is in a state capable of performing the operation, the host may output the SQ DOORBELL signal to the SSD so that the new command output from the host memory is identified.

In step S1311, the SSD may fetch the command queued in the host memory. The SSD may fetch the command and perform the operation corresponding to the fetched command.

Examples of embodiments of the disclosed technology for systems with a host and one or more memory devices and interfacing between a host and a memory device are described.

Variations and improvements of the disclosed embodiments and other embodiments may be made based on what is described or illustrated in this document.

What is claimed is:

1. A peripheral component interconnect express (PCIe) interface system comprising a PCIe interface device, a host, and a non-volatile memory express (NVMe) device connected to the host through the PCIe interface device, wherein the host comprises:
   a host memory configured to store information on a command to be executed on the NVMe device and a command that has been executed on the NVMe device; and
   an NVMe driver configured to transmit the command to be executed on the NVMe device to the host memory, and output a doorbell signal indicating that the command to be executed on the NVMe device has been stored in the host memory to the NVMe device, and
   wherein the NVMe device is configured to request to the host memory to register a lightweight notification (LN) indicating a position in which the command to be executed on the NVMe device is stored and receive an LN message indicating that the command to be executed on the NVMe device is stored in the host memory, from the host memory, prior to the doorbell signal.

2. The PCIe interface system of claim 1, wherein the host memory is configured to queue the command received from the NVMe driver in a submission queue after the LN is registered in the host memory.

3. The PCIe interface system of claim 1, wherein the NVMe device is configured to prefetch the command to be executed on the NVMe device, and perform an operation corresponding to a pre-fetched command.

4. The PCIe interface system of claim 3, wherein the NVMe device is further configured to receive the doorbell signal from the NVMe driver, and upon reception of the doorbell signal, fetch the command to be executed on the NVMe device from the host memory.

5. The PCIe interface system of claim 4, wherein the NVMe device is further configured to perform the operation based on a comparison between the pre-fetched command and the fetched command.

6. The PCIe interface system of claim 5, wherein the NVMe device is further configured to perform the operation corresponding to the pre-fetched command in response to a result of the comparison that indicates that the pre-fetched command and the fetched command are same.

7. The PCIe interface system of claim 5, wherein the NVMe device is further configured to stop the operation corresponding to the pre-fetched command and perform an operation corresponding to the fetched command in response to a result of the comparison that indicates that the pre-fetched command and the fetched command are different.

8. The PCIe interface system of claim 1, wherein, in response to a low power state of the NVMe device, the host memory is further configured to transmit, to a downstream port of a switch included in the interface device, the LN message.

9. The PCIe interface system of claim 8, wherein the switch is further configured to transmit, to the NVMe device, a wake up signal for ending the low power state to the NVMe device based on the LN message, and
   the NVMe device is further configured to receive the wake up signal and change its state from the low power state.

10. The PCIe interface system of claim 9, wherein the NVMe driver is further configured to output the doorbell signal to the NVMe device through the downstream port, and
    the NVMe device is further configured to fetch, from the host memory, the command to be executed on the NVMe device.

11. A method of operating a system, the method comprising:
    requesting, by the system including a host having a host memory and a non-volatile memory express (NVMe) device connected to the host through a peripheral component interconnect express (PCIe) interface device, a PCIe lightweight notification (LN) registration indicating a position in which a command to be executed on the NVMe device is stored within a host memory included in the system;
    registering the LN;
    storing the command to be executed on the NVMe device in the host memory; and
    outputting, to the NVMe device, an LN message indicating that the command to be executed on the NVMe device is stored in the host memory prior to a doorbell signal indicating that the command to be executed on the NVMe device is stored in the host memory.

12. The method of claim 11, wherein the storing of the command comprises queuing the command to be executed on the NVMe device in a submission queue included in the host memory.

13. The method of claim 11, further comprising:
    prefetching the command to be executed on the NVMe device; and
    performing an operation corresponding to a pre-fetched command.

14. The method of claim 13, further comprising:
    fetching the command to be executed on the NVMe device from the host memory upon outputting the doorbell signal, the doorbell signal outputted during the operation corresponding to the pre-fetched command.

15. The method of claim 14, wherein performing the operation corresponding to the pre-fetched command comprises performing the operation corresponding to the pre-fetched command in response to a result of a comparison between the pre-fetched command and the fetched command, the result indicating that the pre-fetched command and the fetched command are same.

16. The method of claim 14, wherein performing the operation corresponding to the pre-fetched command comprises stopping the operation corresponding to the pre-fetched command and performing an operation corresponding to the fetched command in response to a result of a comparison between the pre-fetched command and the fetched command, the result indicating that the pre-fetched command and the fetched command are different.

17. The method of claim 11, further comprising, in response to a low power state of the NVMe device:
  transmitting, to a downstream port of a switch included in the interface device, the LN message indicating that the command to be executed on the NVMe device is stored; and
  transmitting, to the NVMe device, a wake up signal for ending the low power state based on the LN message.

18. The method of claim 17, further comprising:
  outputting, to the NVMe device, the doorbell signal; and
  fetching the command to be executed on the NVMe device from the host memory based on the doorbell signal.

\* \* \* \* \*